United States Patent
Kerhuel (10) Patent No.: US 9,178,560 B1
(45) Date of Patent: Nov. 3, 2015

(54) TIME-FREQUENCY DECODING UNIT

(71) Applicant: Samuel Kerhuel, Villeneuve Tolosane (FR)

(72) Inventor: Samuel Kerhuel, Villeneuve Tolosane (FR)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/606,386

(22) Filed: Jan. 27, 2015

(30) Foreign Application Priority Data

Aug. 27, 2014 (WO) .................. PCT/IB2014/001997

(51) Int. Cl.
| | |
|---|---|
| *H04B 1/00* | (2006.01) |
| *H04B 1/7073* | (2011.01) |
| *H04J 13/00* | (2011.01) |
| *H04B 1/709* | (2011.01) |
| *H04J 13/16* | (2011.01) |
| *H04J 13/20* | (2011.01) |

(52) U.S. Cl.
CPC ............ *H04B 1/70735* (2013.01); *H04B 1/709* (2013.01); *H04J 13/004* (2013.01); *H04J 13/0059* (2013.01); *H04J 13/0062* (2013.01); *H04J 13/16* (2013.01); *H04J 13/20* (2013.01); *H04J 2013/0096* (2013.01)

(58) Field of Classification Search
CPC ..................... H04L 5/026; H04L 2025/03414; H04L 5/0016; H04L 5/06; H04L 5/0007; H04J 13/0062; H04J 13/16; H04J 13/20; H04J 2013/165
USPC .......... 375/130, 144, 146, 147, 149; 370/208, 370/330, 335, 342, 209, 210, 281, 295, 344
See application file for complete search history.

(56) References Cited

U.S. PATENT DOCUMENTS

| | | | |
|---|---|---|---|
| 8,437,332 B2 | 5/2013 | Wang et al. | |
| 2010/0118855 A1* | 5/2010 | Malladi ............... | H04J 13/0062 370/342 |
| 2014/0078972 A1* | 3/2014 | Sorrentino .......... | H04J 13/0074 370/329 |

FOREIGN PATENT DOCUMENTS

CN          103179056 A      6/2013

OTHER PUBLICATIONS

Nakao, S. et al.,"Performance Enhancement of E-UTRA Uplink Control Channel in Fast Fading Environments," Vehicular Technology Conference, 2009. VTC Spring 2009. IEEE 69th , vol., No., pp. 1-5; Apr. 26-29, 2009.

Milos, K. et al., "Simulation of UCI Transmission via PUCCH in LTE Uplink," Radioelektronika (Radioelektronika), 2014 24th International Conference , vol., No., pp. 1-4; Apr. 15-16, 2014.

* cited by examiner

*Primary Examiner* — Leila Malek

(57) ABSTRACT

A decoding unit for decoding a signal modulating a plurality of symbols wherein each symbol carries a plurality of information which are code-division multiplexed in the time domain and in the frequency domain and wherein each information is associated with a known sequence of phase rotations, the phase in the known sequence varying deterministically between the plurality of symbols.

The decoding unit first performs a phase rotation of the received plurality of symbols, then performs the time-domain despreading operation and finally performs the frequency-domain despreading operation.

A processor, a receiver, a method and a computer program are also claimed.

11 Claims, 5 Drawing Sheets

TIME-FREQUENCY DECODING UNIT

CROSS REFERENCE TO RELATED APPLICATION(S)

The present application claims priority to International Patent Application No. PCT/IB2014/001997, entitled "TIME-FREQUENCY DECODING UNIT," filed on Aug. 27, 2014, the entirety of which is herein incorporated by reference.

FIELD OF THE INVENTION

This invention relates to a decoding unit, a processor, a receiver, a method and a computer program for decoding a signal transmitted over a communication channel.

BACKGROUND OF THE INVENTION

In Long-Term Evolution (LTE) by the 3rd Generation Partnership Project (3GPP), the Radio Access Network (RAN) is totally optimized for packet-oriented applications with low latency and high-peak rates. In order to guarantee that the packets are correctly delivered to the upper layers, LTE employs a combination of ARQ (Automatic Repeat Request) and FEC (Forward Error Correction), also known as Hybrid-ARQ. In the uplink, the uplink control channel called the physical uplink control channel (PUCCH), in the format 1/1 a/1 b, is associated with the transmission of Hybrid-ARQ acknowledgements (Downlink ACK/NACKs for format 1a/1b) and scheduling requests (SRs for format 1). Within the PUCCH, multiple UEs can share the same time-frequency resources, the UEs being multiplexed via code division multiplexing (CDM) in the frequency domain and in the time domain, simultaneously.

A conventional receiver for PUCCH format 1/1 a/1b comprises a Matched Filter (MF) channel estimator, at time decorrelator and a frequency decorrelator followed by Maximal Ratio Combining (MRC). In such conventional PUCCH receiver, frequency decorrelation is performed first, time decorrelation is performed later and then MRC is finally performed, in order to retrieve all ACK/NACKs and/or SRs associated with each UE. That solution, although efficient, yields a large number of operations which are not always efficient in terms of performance of the decoder.

SUMMARY OF THE INVENTION

The present invention provides a decoding unit, a processor, a receiver, a method and a computer program for decoding a signal transmitted over a communication channel, as described in the accompanying claims. Specific embodiments of the invention are set forth in the dependent claims. These and other aspects of the invention will be apparent from an elucidated with reference to the embodiments described hereinafter.

BRIEF DESCRIPTION OF THE DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the proposed solution may for the most part, be composed of electronic components and circuits known to those skilled in the art, details will not be explained in any greater extent than that considered necessary for the understanding and appreciation of the underlying concepts of the subject application, in order not to obfuscate or distract from the teachings of the subject application.

However, for a proper understanding of the subject application, the following detailed description will focus on the decoding of a LTE PUCCH channel in the formats 1a/1b.i However, persons skilled in the art of communication networks will readily appreciate that the proposed solution may also apply to LTE PUCCH channel in its format 1 but also in other communication networks different from LTE and other channels different from the PUCCH, in both uplink and downlink, where those others communication networks and others channels exhibit the same characteristics as those described thereinafter.

Figure 1:
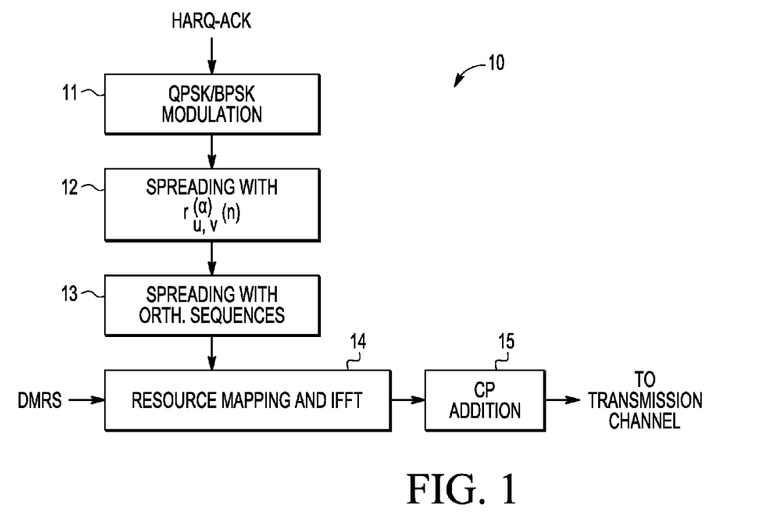
FIG. 1 is a schematic diagram of PUCCH encoder.

First, for the sake of clarity, it will be described how a LTE PUCCH channel is encoded. To that end, reference will be made to FIG. 1 wherein it is shown the process of encoding HARQ-ACK/NACK information associated with a single UE. However, it should be noted that encoding a plurality of UEs is performed in the same way. Also, the encoding of pilot information will not be described in further details since it is very similar to the encoding of HARQ-ACK/NACK information. Referring to FIG. 1, there is diagrammatically shown therein a PUCCH encoder 10. The PUCCH encoder 10 comprises:

a modulation unit 11 such as a QPSK/BPSK (Quadrature Phase Shift Keying/Binary Phase Shift Keying) modulator;

a frequency-domain spreading unit 12 such as a Constant Amplitude Zero Autocorrelation (CAZAC) spreading unit;

a time-domain spreading unit 13 such as an Orthogonal Code Sequences (OCC) spreading unit;

resource mapping and Inverse Fast-Fourier Transform (IFFT) unit 14 such as an IFFT transformer; and, a Cyclic Prefix (CP) addition unit 15 able to add a CP to a time-domain signal.

The modulation unit 11 is operably coupled to the frequency-domain spreading unit 12. The frequency-domain spreading unit 12 is operably coupled to the time-domain spreading unit 13. The time-domain spreading unit 13 is operably coupled to the resource mapping and IFFT unit 14. Finally, the resource mapping and IFFT unit 14 is operably coupled to the CP addition unit 15.

In the PUCCH encoder 10 of FIG. 1, an UE modulates its information (e.g. HARQ-ACK/NACK information, pilot information) using the modulation unit 11, thereby generating a modulated information. For instance, BPSK or QPSK modulations are used for formats 1a/1b of PUCCH channel. Later, for a particular UE, the modulated information is spreaded in the frequency domain across a plurality of subcarriers allocated to the PUCCH channel using the frequency-domain spreading unit 12, thereby generating a modulated-frequency-spreaded information. For instance, for the PUCCH, this is performed by multiplying the modulated information by a cyclic shift sequence designed from a frequency-domain base sequence associated with a given cell. In LTE, the frequency-domain base sequence is a Zadoff-Chu (ZC) sequence which is used for minimising cross-correlation between different UE signals in the same cell. In fact, a ZC sequence exhibits constant amplitude zero autocorrelation (CAZAC) property in the frequency domain. Therefore, by cyclically shifting the coefficients of the ZC sequence using different cyclic shift values in the time domain, an orthogonal sequence set of the cyclic shift sequences may be generated. Similarly, the same set of sequences may be obtained by phase rotating the spectrum elements of the ZC sequence using different phase rotations. It results from this operation that, in the LTE PUCCH channel, more than one UE are multiplexed on the same set of carriers using different phase rotated versions of the ZC sequence in the frequency domain or using different cyclic shift values in the time domain. Later, the modulated-frequency-spreaded information is spreaded in time domain, over a given number of symbols using the time-domain spreading unit 13, thereby generating a modulated-frequency-and-time-spreaded information. For instance, for the PUCCH, this is performed by multiplying the modulated-frequency-spreaded information by elements of a time-domain sequence, the time-domain sequence being used to separate users mapped into the same resources. In LTE, Walsh-Hadamard sequences and discrete Fourier transform (DFT) sequences, which are orthogonal code sequences (OCCs), are used for this purpose. It results from this operation that, in the LTE PUCCH channel, modulated-frequency-spreaded information associated with different UEs are multiplexed in the same symbol using different OCCs. Next, the modulated-frequency-and-time-spreaded information is arranged into a plurality of symbols which is converted from the frequency domain to the time domain using the resource mapping and IFFT unit 14, thereby producing a time-domain signal. The time-domain signal has the particularity that, for each UE's information, each of the plurality of symbols is associated with a different cyclic shift (or phase rotation). In other words, each UE's information is associated with a sequence of phase rotations (or cyclic shifts), wherein the phase rotations (or cyclic shifts) in the sequence varies between the plurality of symbols. Thereinafter, references will only be made to phase rotations in the sequences although references could have been made to cycle shifts in a similar way. The difference being whether frequency domain is considered (i.e. reference to phase rotations) or time domain is considered (i.e. reference to cyclic shifts). Finally, after the addition of a cyclic prefix (CP) using the CP addition unit 15, the time-domain signal enters the transmission channel. In LTE, the transmission channel is a wireless transmission channel. As stated earlier, the encoding process of the pilot information will not be described since it is quite similar to the one of the HARQ-ACK/NACK information. However, it is to be noted that a demodulation reference signal (DMRS) carrying the pilot information in dedicated symbols, is also included in the time-domain signal for channel estimation purposes.

As a result of the encoding process by the PUCCH encoder 10, a PUCCH decoder has to decode a composite signal transmitted over the communication channel of a wireless network. Indeed, the time-domain signal carries information associated with a plurality of UEs which are code division multiplexed into the frequency-domain and in the time-domain. Namely, the composite signal modulates a plurality of symbols wherein each symbol is arranged to carry a plurality of information (i.e. HARQ-ACK/NACK and pilot information) which are code-division multiplexed. In fact, each information is spreaded:

in the frequency domain, across a given plurality of frequency carriers, based on a phase rotated version of a known code exhibiting CAZAC property; and, in the time domain, across the plurality of symbols, based on one of a plurality of known OCCs.

Finally, each information is associated with a known sequence of phase rotations of the CAZAC code, the phase rotation in the known sequence varying between the plurality of symbols of the received time-domain signal.

Figure 2A:
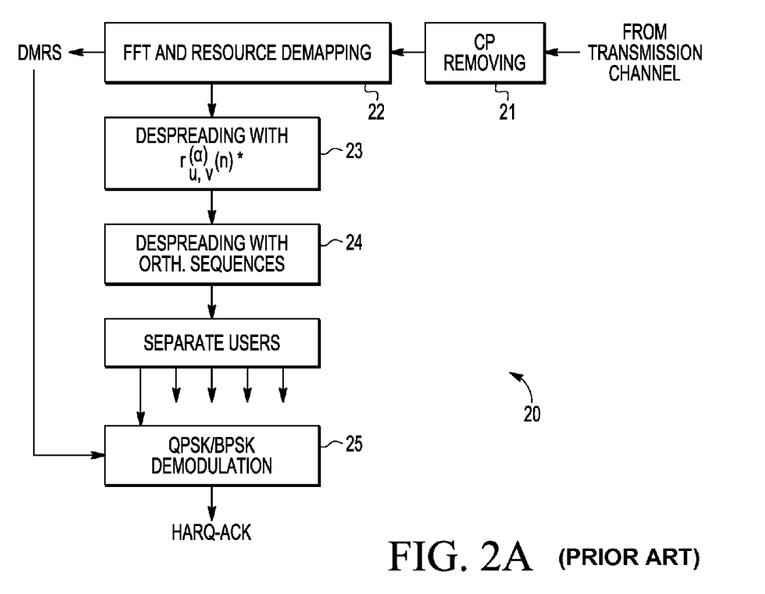
FIG. 2A is a schematic diagram of a conventional PUCCH decoder.

Referring to FIG. 2A, there is diagrammatically shown therein a conventional PUCCH decoder 20 able to decode the time-domain signal generated by the PUCCH encoder 10. The conventional PUCCH decoder 20 comprises:

a CP removing unit 21 able to remove a CP from the time-domain signal;

a Fast-Fourier Transform (FFT) and resource demapping unit 22 such as a FFT transformer;

a frequency-domain despreading unit 23 such as a CAZAC despreading unit;

a time-domain despreading unit 24 such as an OCC despreading unit; and, a demodulation unit 25 such as a QPSK/BPSK demodulator.

The CP removing unit 21 is operably coupled to the FFT and resource demapping unit 22. The FFT and resource demapping unit 22 is operably coupled to the frequency-domain despreading unit 23. The frequency-domain despreading unit 23 is operably coupled to the time-domain despreading unit 25. Finally, the time-domain despreading unit 25 is operably coupled to the demodulation unit 26.

Figure 2B:
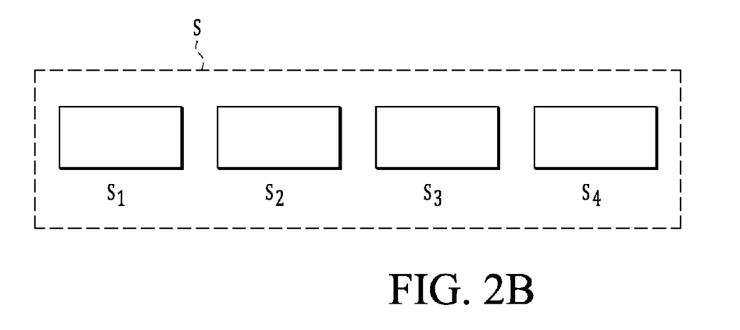
FIG. 2B is a schematic diagram of an exemplary frequency-domain signal received by the PUCCH decoder of FIG. 2A.

Referring to FIG. 2A, after the time-domain signal has passed through the transmission channel, the cyclic prefix is removed by the CP removing unit 21. Later, the time-domain signal comprising the plurality of symbols is converted into the frequency domain using the FFT and resource demapping unit 22, thereby generating a frequency-domain signal which also comprises the plurality of symbols represented in the frequency domain. In the example of FIG. 2B, there is shown therein an exemplary frequency-domain signal S comprising a plurality of symbols s1, s2, s3, s4. The frequency-domain signal S of FIG. 2B is represented in the time domain for an easier understanding of the proposed solution. In FIG. 2B, there is only represented four data symbols s1, s2, s3, s4 associated with the frequency-domain signal S. However, one of ordinary skills in the art of communication networks knows that pilot symbols, used for channel estimation purposes, are also part of the frequency-domain signal S. For the sake of simplicity, pilot symbols are not represented since the decoding process is similar. Referring back to FIG. 2A, the frequency-domain signal S is despreaded, in the frequency domain, using the frequency-domain despreading unit 23.

For instance, for the PUCCH, this is performed by multiplying each of the plurality of symbols s1, s2, s3, s4 comprised in the frequency-domain signal S by the conjugate of the full set of the ZC sequences (i.e. all the phase rotated versions of the base code exhibiting CAZAC property), thereby separating the frequency-domain signal S into different parts, each part being associated with a unique ZC sequence. In LTE, there are twelve ZC sequences that can be derived from the ZC base sequence. This means, that in LTE, the frequency-domain signal S may be separated into twelve parts, each being associated with a unique ZC sequence. Later, each unique ZC sequence-based part of the frequency-domain signal S is despreaded, in the time domain, using the time-domain despreading unit 24. For instance, for the PUCCH, this is performed by multiplying each unique ZC sequence-based part of the frequency-domain signal S by the conjugate of the full set of the OCCs, thereby separating each unique ZC sequence-based part of the frequency-domain signal S into several parts, each part being associated with a unique OCC. In LTE, there are three OCCs that can be used simultaneously. This means, that in LTE, each unique ZC sequence-based part of the frequency-domain signal S may be separated into three parts, each being associated with a unique OCC. Finally, each information (e.g. HARQ-ACK/NACK, pilot information) is demodulated from each part of the frequency-domain signal S associated with a unique ZC sequence and a unique OCC using the demodulation unit 25, thus retrieving each UE's information. As can be seen in FIG. 2A, the demodulation process is performed based on the channel estimate obtained from the DMRS.

Figure 3A:
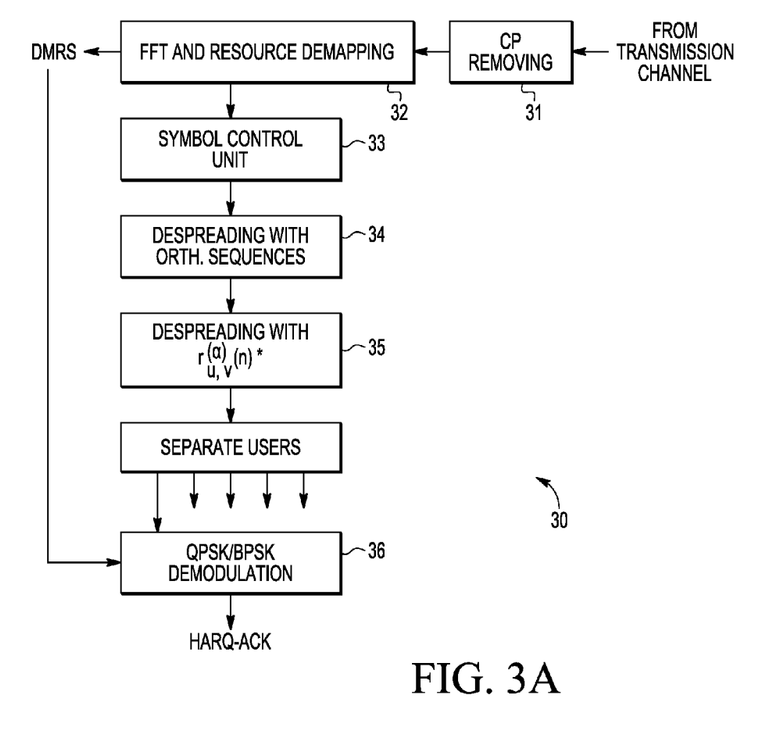
FIG. 3A is a schematic diagram of a decoding unit according to embodiments of the subject application.

Referring now to FIG. 3A, there is diagrammatically shown therein a decoding unit 30 in accordance with embodiments of the subject application. The decoding unit 30 is arranged to decode the time-domain signal generated by the PUCCH encoder 10. The decoding unit 30 comprises:
- a CP removing unit 31 which is similar to the CPU unit 21 of the conventional PUCCH decoder 20;
- a FFT and resource demapping unit 32 which is similar to the FFT and resource demapping unit 22 of the conventional PUCCH decoder 20;
- a symbol control unit 33 such as a processor;
- a time-domain despreading unit 34 which is similar to the time-domain despreading unit 24 of the conventional PUCCH decoder 20;
- a frequency-domain despreading unit 35 which is similar to the frequency-domain despreading unit 23 of the conventional PUCCH decoder 20; and,
- a demodulation unit 36 which is similar to the demodulation unit 25 of the conventional PUCCH decoder 20.

The CP removing unit 31 is operably coupled to the FFT and resource demapping unit 32. The FFT and resource demapping unit 32 is operably coupled to the symbol control unit 33. The symbol control unit 33 is operably coupled to the time-domain despreading unit 34. The time-domain despreading unit 34 is operably coupled to the frequency-domain despreading unit 35. Finally, the frequency-domain despreading unit 35 is operably coupled to the demodulation unit 36.

As can be clearly seen while comparing the conventional PUCCH decoder 20 of FIG. 2A with the decoding unit 30 of FIG. 3A, it can readily be noticed that the frequency-domain operation of the frequency-domain despreading unit 23 is performed before the time-domain operation of the time-domain despreading unit 24 in FIG. 2A while the converse order of operations is used in the decoding unit 30 of FIG. 3A. Indeed, in FIG. 3A, the time-domain operation of the time-domain despreading unit 34 is performed before the frequency-domain operation of the frequency-domain despreading unit 35. Another difference is the presence of the symbol control unit 33 in the decoding unit 30 of FIG. 3A which is not present in the PUCCH decoder 20 of FIG. 2A. The effect of the particular arrangement of the decoding unit of FIG. 3A along with the symbol control unit, over the PUCCH decoder 20 of FIG. 2A, will be described thereinafter.

Figure 3B:
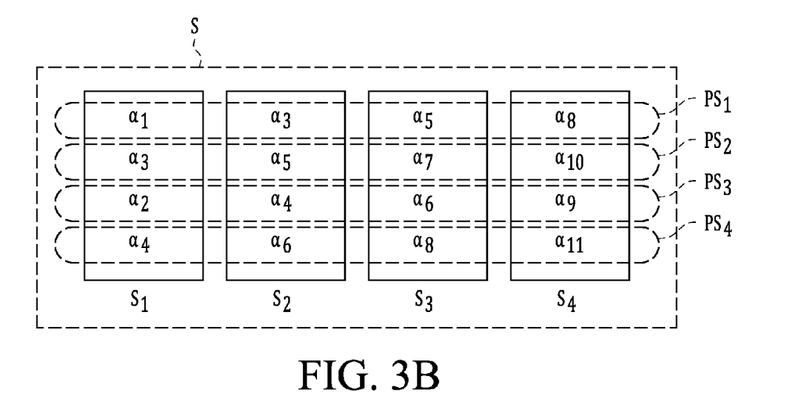
FIG. 3B is a schematic diagram of an exemplary frequency-domain signal received by the decoding unit of FIG. 3A.

In the example of FIG. 3A, after the time-domain signal has passed through the transmission channel, the cyclic prefix is removed by the CP removing unit 31. Later, the time-domain signal comprising the plurality of symbols is converted into the frequency domain using the FFT and resource demapping unit 32, thereby generating a frequency-domain signal which also comprises the plurality of symbols represented in the frequency domain. In the example of FIG. 3B, there is shown therein an exemplary frequency-domain signal S comprising a plurality of symbols s1, s2, s3, s4. The frequency-domain signal S of FIG. 3B is represented in the time domain for an easier understanding of the proposed solution. In FIG. 3B, there is only represented four data symbols s1, s2, s3, s4 associated with the frequency-domain signal S. However, one of ordinary skills in the art of communication networks knows that, in LTE PUCCH channel, pilot symbols are also part of the frequency-domain signal S, for channel estimation purposes. For the sake of simplicity, pilot symbols are not represented since the decoding process is similar.

Later in FIG. 3A, the plurality of symbols s1, s2, s3, s4 comprised in the frequency-domain signal S is handled by the symbol control unit 33. Namely, the symbol control unit 33 is arranged to receive the plurality of symbols s1, s2, s3, s4 along with the associated sequence of phase rotations. Indeed, as earlier stated and as indicated in FIG. 3B, the decoding unit 30 is aware of the sequences of phase rotations Ps1, Ps2, Ps3, Ps4 associated with the plurality of symbols s1, s2, s3, s4. For instance, in FIG. 3B, the sequence of phase Ps1 comprises the phase rotations $\alpha1$, $\alpha2$, $\alpha3$ and $\alpha4$ which are respectively associated with the symbols s1, s2, s3, s4 of the frequency-domain signal S. Similarly, the sequence of phase Ps2 comprises the phase rotations $\alpha3$, $\alpha5$, $\alpha7$ and $\alpha10$ which are respectively associated with the symbols s1, s2, s3, s4 of the frequency-domain signal S. Further, the sequence of phase Ps3 comprises the phase rotations $\alpha2$, $\alpha4$, $\alpha6$ and $\alpha9$ which are respectively associated with the symbols s1, s2, s3, s4 of the frequency-domain signal S. Finally, the sequence of phase Ps4 comprises the phase rotations $\alpha6$, $\alpha6$, $\alpha8$ and all which are respectively associated with the symbols s1, s2, s3, s4 of the frequency-domain signal S. By analysing how are formed the sequences of phase rotations Ps1, Ps2, Ps3, Ps4, as described in the LTE standard 3GPP TS 36.211 (Section 5.4.1), it has been found that phase rotations, within all sequences of phase rotations Ps1, Ps2, Ps3, Ps4 are varying deterministically in a similar fashion between the plurality of symbols s1, s2, s3, s4. Namely, in the example of FIG. 3B, the difference of phase in Ps1, which exists between the phase rotation $\alpha1$ associated with the symbol s1 and the phase rotation $\alpha3$ associated with the symbol s2 is similar to the difference of phase in Ps2, which exists between the phase rotation $\alpha3$ associated with the symbol s1 and the phase rotation $\alpha5$ in the symbol s2. Similarly, the difference of phase in Ps1, which exists between the phase rotation $\alpha1$ associated with the symbol s1 and the phase rotation $\alpha3$ associated with the symbol s2 is the same as the difference of phase in Ps3, which exists between the phase rotation $\alpha2$ associated with the symbol s1 and the phase rotation $\alpha4$ in the symbol s2. Also, the difference of phase in Ps1, which exists between the phase rotation $\alpha1$ associated with the symbol s1 and the phase rotation $\alpha3$ associated with the symbol s2 is the same as the difference of phase in Ps4, which exists between the phase rotation α4 associated with the symbol s1 and the phase rotation α6 in the symbol s2. The same applies to others symbols s1, s2, s3, s4 taken two by two (i.e. s1 and s3, or s1 and s4, or s2 and s3, or s2 and s4, or s3 and s4). In other words, the difference of phase rotation associated with symbols taken two by two is identical for all UE's information.

Figure 3C:
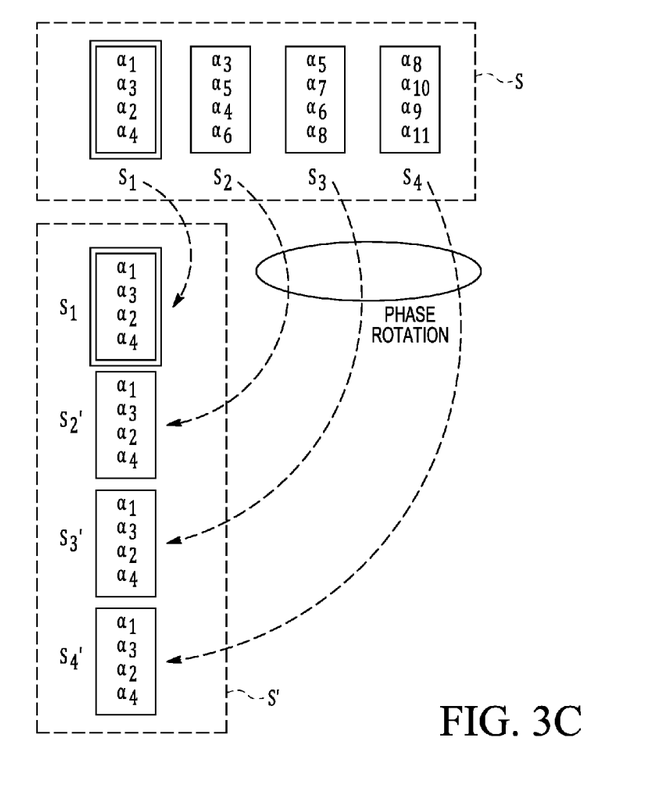
FIG. 3C is a schematic diagram of the exemplary frequency-domain signal of FIG. 3B as manipulated by the decoding unit of FIG. 3A.

The symbol control unit 33, which is not present in the conventional PUCCH decoder 20, allows to take advantage of the foregoing identified property of the sequences of phase rotations Ps1, Ps2, Ps3, Ps4, e.g. in order to reduce the number of operations that are required to decode a PUCCH channel, for instance Referring now to FIG. 3C along with FIG. 3A, the symbol control unit 33 is configured to determine one predefined reference symbol out of the plurality of symbols s1, s2, s3, s4. In the example FIG. 3C, it is the symbol s1 (highlighted in bold) which is selected as the predefined reference symbol. However, any of the plurality of symbols s1, s2, s3, s4 may have been selected as the predefined reference symbol for the purpose of the subject application. Namely, each of the symbols s2, s3 or s4 may also have selected as predefined reference symbol. Further, once the predefined reference symbol is selected, the symbol control unit 33 is also arranged to align the phase rotations, within each sequence of phase rotations Ps1, Ps2, Ps3, Ps4, on the phase rotations associated with the predefined reference symbol, thereby producing a frequency-domain signal S' comprising a plurality of aligned symbols s1, s'2, s'3, s'4, which are all aligned on the symbol s1, in the example of FIG. 3C. Basically, referring to FIG. 3B and FIG. 3C, since the symbol s1 has been selected as the predefined common symbol, then within each sequence of phase rotations Ps1, Ps2, Ps3, Ps4, the symbol control unit 33 is arranged to aligned all the respective phase rotations, on the phase rotation, of each sequence of phase rotations Ps1, Ps2, Ps3, Ps4 which is associated with the symbol s1. For instance, regarding the sequence of phase rotations Ps1, the phase rotation which is associated with the symbol s1 is the phase rotation α1. Therefore, the other phase rotations of the sequence of phase rotations Ps1, namely phase rotations α3, α5 and α8, will be aligned on the phase rotation α1 by the symbol control unit 33. Regarding the sequence of phase rotations Ps2, the phase rotation which is associated with the symbol s1 is the phase rotation α3. Therefore, the other phase rotations of the sequence of phase rotations Ps2, namely phase rotations α5, α7 and α10, will be aligned on the phase rotation α3 by the symbol control unit 33. Regarding the sequence of phase rotations Ps3, the phase rotation which is associated with the symbol s1 is the phase rotation α2. Therefore, the other phase rotations of the sequence of phase rotations Ps3, namely phase rotations α4, α6 and α9, will be aligned on the phase rotation α2 by the symbol control unit 33. Finally, regarding the sequence of phase rotations Ps4, the phase rotation which is associated with the symbol s1 is the phase rotation α4. Therefore, the other phase rotations of the sequence of phase rotations Ps4, namely phase rotations α6, α8 and α11, will be aligned on the phase rotation α4.

As explained earlier, the phase rotation variations between each of the plurality of symbols s1, s2, s3, s4 is deterministic and similar while being taken two-by-two, so that the alignment of phase rotations can be performed once for each symbols s2, s3, s4. Therefore, in the example of FIG. 3C, only three phase rotations are needed in order for the symbol control unit 33 to align the phase rotations, thereby producing the frequency-domain signal S' comprising a plurality of aligned symbols s1, s'2, s'3, s'4.

In an embodiment, the symbol control unit 33 comprises a phase rotator arranged to simultaneously rotate all the phase rotations associated with each of the plurality of symbols s1, s2, s3, s4, in the frequency domain, thereby producing the plurality of aligned symbols s1, s'2, s'3, s'4. Equally, in the time domain, the effect the phase rotator is equivalent to time-shifting all the cyclic shifts associated with each of the plurality of symbols s1, s2, s3, s4, thereby producing the plurality of aligned symbols s1, s'2, s'3, s'4.

Referring back to FIG. 3A, the frequency-domain signal S' comprising the plurality of aligned symbols s1, s'2, s'3, s'4 is despreaded, in the time domain, using the time-domain despreading unit 34. For instance, for the PUCCH, this is performed by multiplying each of the plurality plurality of aligned symbols s1, s'2, s'3, s'4 of the frequency-domain signal S' by the conjugate of the full set of the OCCs, thereby separating the frequency-domain signal S' into different parts, each being associated with a unique OCC. The time-domain despreading operation is possible, at that moment in the decoding unit, because all the aligned symbols s1, s'2, s'3, s'4 are all on the same dimension (i.e. same cyclic shift). Therefore, since in LTE there are three OCCs, it means that only three multiplying operations will be needed in order to separate the frequency-domain signal S' into three unique OCC-based part of the frequency-domain signal S'. Later, each unique OCC-based part of the frequency-domain signal S' is despreaded, in the frequency-domain, using the frequency-domain despreading unit 35. For instance, for the PUCCH, this is performed by multiplying each unique OCC-based part of the frequency-domain signal S' by the conjugate of the full set of the ZC sequences (i.e. all the phase rotated versions of the base code exhibiting CAZAC property), thereby separating each unique OCC-based part of the frequency-domain signal S' into several parts, each being associated with a unique ZC sequence. This means, that in LTE, each unique OCC-based part of the frequency-domain signal S' may be separated into twelve parts, each being associated with a unique ZC sequence. Finally, each UE's information (e.g. HARQ-ACK/NACK) is demodulated from each part of the frequency-domain signal S' associated with a unique ZC sequence and a unique OCC, using the demodulation unit 25, thus retrieving each UE's information. As can be seen in FIG. 3A, the demodulation process is performed based on the channel estimate obtained from the DMRS.

In view of the foregoing, it is now clear that a phase rotation of the received plurality of symbols is performed before the time-domain despreading operation and that the time-domain despreading operation performed by the time domain despreading unit 34 of the decoding unit 30 is executed prior the execution of the frequency-domain despreading operation performed by the frequency-domain despreading unit 35. This particular arrangement brings certain advantages in terms of performance and reduction of complexity over the conventional PUCCH decoder 20 of FIG. 2.

In order to clearly see the differences that exist, let's consider the example illustrated in FIG. 3B. In order to assess performance improvements of the proposed solution, particular attention will be put on the number of multiplying operations performed by the respective time-despreading operation and the frequency-despreading operation, of the conventional PUCCH decoder 20 and the decoding unit 30. In fact, multiplying operations are the more power consuming elements during the decoding process.

Using the conventional PUCCH decoder 20 with the example of FIG. 3B, it is first required to perform at least sixteen multiplying operations during the frequency despreading operation. Indeed, as there are four phase rotations associated with each symbol s1, s2, s3, s4, it is required to perform four multiplying operations per symbol s1, s2, s3, s4 in order to separate each of them into four different parts, each being associated with a unique ZC sequence. For instance in FIG. 3B, after the frequency-despreading of the symbol s1, there will be four parts, each being associated with the phase rotations α1, α3, α2 and α4 respectively. The same reasoning can be applied to the others symbols s2, s3 and s4. At the end, there will be eleven different parts, each being associated with a unique ZC sequence (i.e. α1, α2, α3, α4, α5, α6, α7, α8, α9 α10 and α11). Later, still referring to the conventional PUCCH decoder 20, during the time despreading operation, it is required to perform at least thirty multiplying operations. Indeed, as there are eleven phase rotated version of the base ZC sequence in FIG. 3B and that there are three OCCs in LTE, it is required to perform three multiplying operations per parts obtained after the frequency-domain despreading. In total, the conventional PUCCH decoder 20 needs up to forty nine multiplying operations with the example of FIG. 3B.

In contrast, it would be required up to thirty six multiplying operations with the decoding unit 30 of FIG. 3A while working with the example of FIG. 3B. In fact, since all the aligned symbols s1, s'2, s'3, s'4 are all on the same dimension, it is only first required to perform three multiplying operations during the time despreading operation, as already explained earlier. Later, for the same reasons as described above for the conventional PUCCH decoder 20, it would be required thirty three multiplying operations during the frequency despreading operation. That is why, in total, the decoding unit 30 needs up to thirty six multiplying operations with the example of FIG. 3 which is far less than what it is required for the PUCCH decoder 20 of FIG. 3B.

Figure 4:
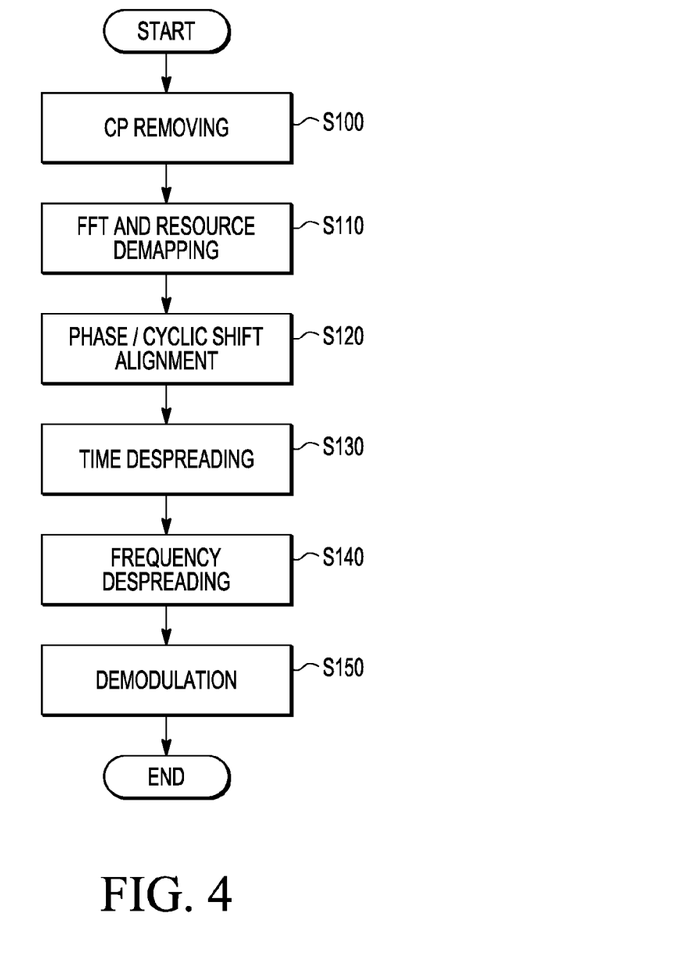
FIG. 4 is a schematic flow diagram of a method of decoding a signal transmitted over a communication channel of a wireless according to an embodiment of the subject application.
Figure 5:
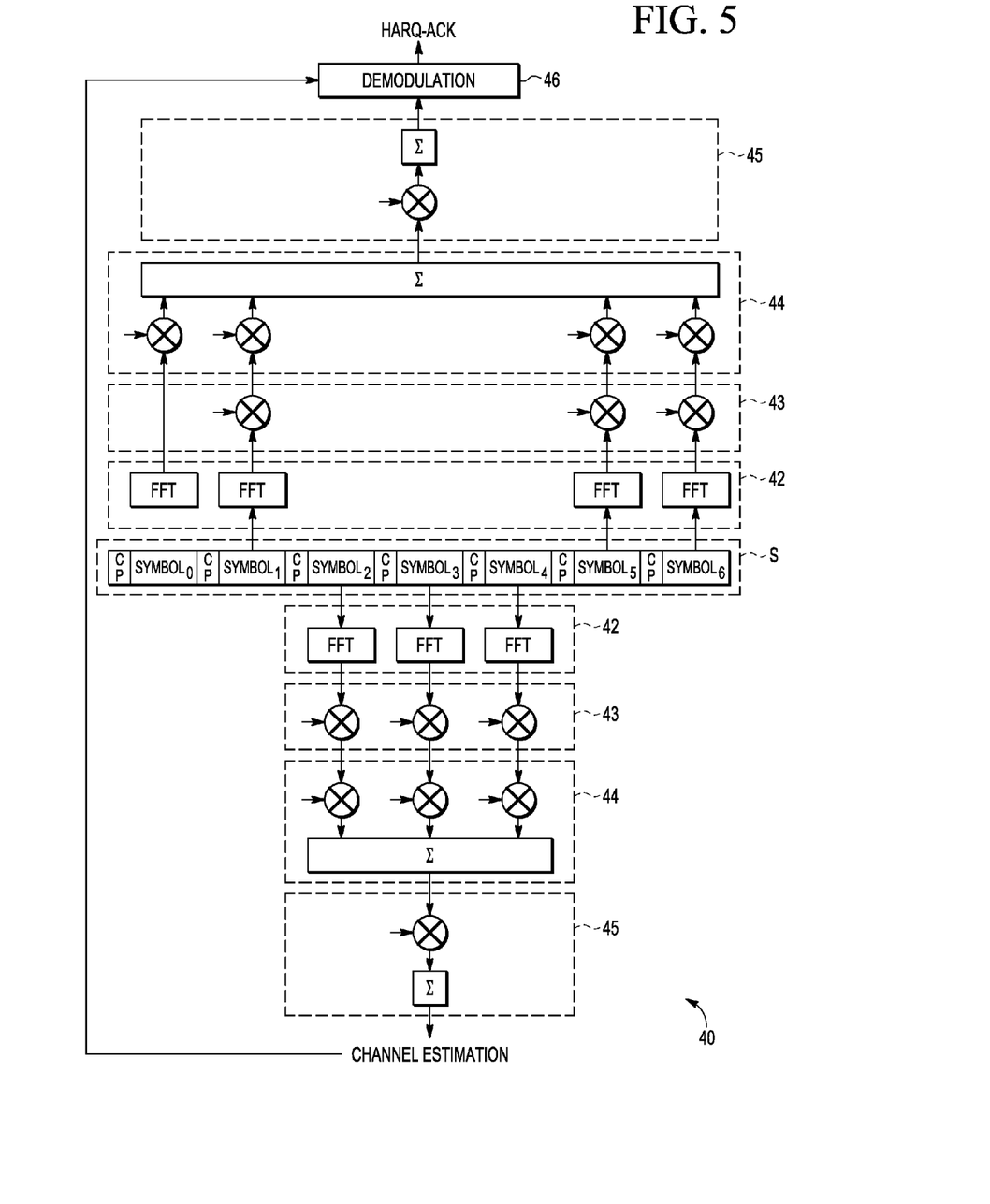
FIG. 5 is a schematic diagram of another decoding unit according to embodiments of the subject application.

For the sake of completeness, another embodiment of the decoding unit 20 will be thereinafter with reference to FIG. 4 along with FIG. 5. In FIG. 4, there is diagrammatically shown therein a schematic flow diagram of a method of decoding a signal transmitted over a communication channel of a wireless network according to an embodiment of the subject application. The method of FIG. 4 Referring to FIG. 5 there is diagrammatically shown therein a schematic diagram of a PUCCH decoder according to embodiments of the subject application, wherein only one UE's information (e.g. HARQ-ACK/NACK) is decoded. In the example of FIG. 5, it is shown a decoding unit 40, used for decoding a time-domain signal S comprised in one slot of subframe of the LTE PUCCH channel. In the example of FIG. 5, data symbols and pilot symbols (in grey colour) are represented. Similarly, the same reasoning applies for the other slot of the subframe which is not shown therein. The decoding unit 40 comprises the same elements as those present in the decoding unit 30 of FIG. 3A. Namely, the FFT and resource demapping units 32 and 42 are similar, the symbol control units 33 and 43 have similar functions, the time-despreading units 34 and 44 have similar functions, the frequency-despreading units 35 and 45 have similar functions and the demodulation units 36 and 46 also have similar functions.

In S100, for each symbol of the received time-domain signal S, the cyclic prefix is removed using the CP removing unit 31, for instance. The effect of this operation can be readily seen in FIG. 5, as the cyclic prefix or shown (CP) is not considered in any further operations. Later, in S110, each symbol is converted from the time-domain to the frequency-domain using the FFT resource demapping unit 41, for instance. In S110, the FFT operation is performed once for all UE's information. Further, in S120, the phase or cyclic shift of each symbol is aligned on the phase of the symbol Symbol0 using the symbol control unit 43, for instance. As said earlier, the operation of S130 is common to all UE's information since the difference of phase rotation associated with symbols taken two by two is identical for all UE's information. In the example of FIG. 5, this operation is performed by a phase rotator, for instance. One of ordinary skills in the art of communication networks would readily notice that, in FIG. 5, there is no phase rotation applied on the Symbol0 since it is considered as being the predefined common symbol, as already described above.

In one embodiment, there may be more than one predefined common symbol selected. In the example of FIG. 5 there may be two predefined symbols selected. For instance, Symbol0 may be selected for the data symbols and symbol3 may be selected for the pilot symbols. In that case, there will be no phase rotation applied to the Symbol3. Further, in this embodiment the Symbol2 and Symbol4 would be aligned on the phase of Symbol3 while Symbol1, Symbol5 and symbol6 would be aligned on the phase of Symbol0. Indeed, the teachings of the subject application may be applied to separate parts of the plurality of symbols that are to be demodulated.

Furthermore, in S130, time despreading is performed using the time despreading unit 44, for instance. As already stated earlier, the processing of S130 is common to all UE's information sharing the same OCC. In the time despreading unit 44 of FIG. 5, the summing unit is used to integrate (i.e. average) the results obtained on the three pilot symbols and also on the four data symbols. This latter processing operation is common to all UE's information sharing the same OCC. In S140, frequency despreading is performed using the frequency despreading unit 45, for instance. In the frequency despreading unit 45 of FIG. 5, the summing unit is used to integrate (i.e. average) the results obtained on the twelve pilot subcarriers on which spreading was performed by the frequency spreading unit 12 of the PUCCH encoder 10. Finally, in S150, symbol demodulation is performed using the demodulation unit 46, for instance.

The above description elaborates embodiments of the subject application with regard to a PUCCH channel of a LTE wireless network. However, those skilled in the art will understand on the basis of the teachings of the present application that others channels of at those wireless networks, embodying the same characteristics as the PUCCH, may be decoded according to the teachings of the subject application. Additionally, the proposed solution can be applied indifferently to different size of cyclic prefix, different number of antennas and number of symbols carried by the received time-domain signal S.

Of course, the above advantages are just examples, and these or other advantages may be achieved by the proposed solution. Further, the skilled person will appreciate that not all advantages stated above are necessarily achieved by embodiments described herein.

A processor such as a micro-controller, state machine, or the like which implements the symbol control unit 33 and/or the decoding unit 30 of the subject application is also claimed. A receiver, such as LTE eNodeB or UE receiver, comprising a processor as claimed and one or more antennas is also claimed. Indeed, all the operations of the foregoing description had been made regarding a single antenna. However, the same teachings may be applied to more than one antenna in a similar way. Later on, the results of obtained on each antennas may be merged together using for instance MRC (Maximum Ratio Combining).

The proposed solution may also be implemented in a computer program product stored in a non-transitory computer-readable storage medium that stores computer-executable code which causes a processor computer to perform the operation of the decoding unit 30 and/or the example of a method as illustrated in the foregoing description, for instance.

A computer program product is a list of instructions such as a particular application program and/or an operating system. The computer program may for example include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory unit storage media including semiconductor-based memory units such as FLASH memory, EEPROM, EPROM, ROM; ferromagnetic digital memories; MRAM; volatile storage media including registers, buffers or caches, main memory, RAM, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as an operation to users and programs of the system.

The computer system may for example include at least one processing unit, associated memory unit and a number of input/output (I/O) devices. When executing the computer program, the computer system processes information according to the computer program and produces resultant output information via I/O devices.

In the foregoing specification, the proposed solution has been described with reference to specific examples of embodiments of the proposed solution. It will, however, be evident that various modifications and changes may be made therein without departing from the broader scope of the proposed solution as set forth in the appended claims. Further, the present invention can be applied not only to a base station device but also to a mobile station. Moreover, although the LTE radio communications system is described as an example in the foregoing exemplary embodiment, the present invention is not limited to LTE radio communications systems but also can be applied other radio communications systems that include at least one base station and mobile stations. The present invention can be applied to radio communications system in which demodulation processing of uplink or downlink control signals is performed, simultaneously in both frequency and time domains. For example, the present invention can be applied to any of a base station and a mobile station in a mobile communications system.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or operations then those listed in a claim. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A decoding unit for decoding at least part of a signal transmitted over a communication channel of a wireless network, the signal modulating a plurality of symbols, each symbol being arranged to carry a plurality of information which are code-division multiplexed, each information being spreaded:
   in the frequency domain, across a given plurality of frequency carriers, based on a phase rotated version of a known code exhibiting constant-amplitude zero auto-correlation, CAZAC, property; and,
   in the time domain, across the plurality of symbols, based on one of a plurality of known orthogonal cover codes;
   wherein each information is associated with a known sequence of phase rotations, the phase in the known sequence varying deterministically between the plurality of symbols;
   the decoding unit comprising:
   a symbol control unit arranged to:
      receive the plurality of symbols and the associated sequence of phase rotations,
      determine a predefined reference symbol out of the received plurality of symbols;
      align the phase rotations, within each received sequence, on the phase rotation associated with the predefined reference symbol, thereby producing a plurality of aligned symbols;
   a time-domain despreading unit coupled to the symbol control unit and arranged to despread, in the time domain, the plurality of aligned symbols according to the known orthogonal cover codes; and,
   a frequency-domain despreading unit coupled to the time-domain despreading unit and arranged to despread, in the frequency domain, the time domain despreaded aligned symbols according to the known CAZAC codes.

2. The decoding unit of claim 1 wherein the symbol control unit further comprises:
   a phase rotator arranged to rotate phase rotations associated with a received symbol in the frequency domain so as to match the phase rotation associated with the predefined reference symbol.

3. The decoding unit of claim 1 wherein:
   the CAZAC code is a Zadoff-Chu sequence; and,
   the orthogonal cover codes are any of Walsh-Hadamard, WH, sequences or discrete Fourier transform, DFT, sequences.

4. The decoding unit of claim 3 wherein the communication channel is a Long Term Evolution (LTE) Physical Uplink Control Channel, PUCCH.

5. A processor comprising the decoding unit of claim 1.

6. A receiver comprising:
the processor of claim 5; and,
one or more antennas.

7. A method of decoding at least part of a signal transmitted over a communication channel of a wireless network, the signal modulating a plurality of symbols, each symbol being arranged to carry a plurality of information which are code-division multiplexed, each information being spreaded:
  in the frequency domain, across a given plurality of frequency carriers, based on a phase rotated version of a known code exhibiting constant-amplitude zero autocorrelation, CAZAC, property; and,
  in the time domain, across the plurality of symbols, based on one of a plurality of known orthogonal cover codes;
  wherein each information is associated with a known sequence of phase rotations, the phase in the known sequence varying deterministically between the plurality of symbols;
  the method comprising:
  providing a processing unit, such as a processor, arranged to:
    receive the plurality of symbols and the associated sequence of phase rotations,
    determine a predefined reference symbol out of the received plurality of symbols;
    align the phase rotations, within each received sequence, on the phase rotation associated with the predefined reference symbol, thereby producing a plurality of aligned symbols;
  providing a time-domain despreading unit coupled to the processing unit and arranged to despread, in the time domain, the plurality of aligned symbols according to the known orthogonal cover codes; and,
  providing a frequency-domain despreading unit coupled to the time-domain despreading unit and arranged to despread, in the frequency domain, the time domain despreaded aligned symbols according to the known CAZAC codes.

8. The method of claim 7 further comprises:
causing the processing unit to rotate phase rotations associated with a received symbol in the frequency domain so as to match the phase rotation associated with the predefined reference symbol.

9. The method of claim 7 wherein:
the CAZAC code is a Zadoff-Chu sequence; and,
the orthogonal cover codes are any of Walsh-Hadamard, WH, sequences or discrete Fourier transform, DFT, sequences.

10. The method of claim 9 wherein the communication channel is a Long Term Evolution (LTE) Physical Uplink Control Channel, PUCCH.

11. A computer program product stored in a non-transitory computer-readable storage medium that stores computer-executable code for decoding at least part of a signal transmitted over a communication channel of a wireless network, the signal modulating a plurality of symbols, each symbol being arranged to carry a plurality of information which are code-division multiplexed, each information being spreaded:
  in the frequency domain, across a plurality of frequency carriers, based on a phase rotated version of a known code exhibiting constant-amplitude zero autocorrelation, CAZAC, properties; and,
  in the time domain, across the plurality of symbols, based on one of a plurality of known orthogonal cover codes;
  wherein each information is associated with a known sequence of phase rotations, the phase in the known sequence varying deterministically between the plurality of symbols, the computer-executable process causing a processor computer to perform the method according to claim 7.

* * * * *